(12) United States Patent
Chung et al.

(10) Patent No.: US 7,471,245 B2
(45) Date of Patent: Dec. 30, 2008

(54) METHOD AND APPARATUS FOR ESTIMATING GEOLOCATIONS

(75) Inventors: Hyo K. Chung, Greenville, TX (US); Phuong H. Le, Plano, TX (US); John M. Parker, Sachse, TX (US); David L. Reid, Richardson, TX (US); Mark A. Robertson, Greenville, TX (US)

(73) Assignee: L3 Communications Integrated Systems, L.P., Greenville, TX (US)

( * ) Notice: Subject to any disclaimer, the term of this patent is extended or adjusted under 35 U.S.C. 154(b) by 17 days.

(21) Appl. No.: 11/669,734

(22) Filed: Jan. 31, 2007

(65) Prior Publication Data

US 2008/0180325 A1    Jul. 31, 2008

(51) Int. Cl.
*G01S 3/02* (2006.01)
(52) U.S. Cl. ..................... 342/465; 342/451
(58) Field of Classification Search ........... 342/451, 342/463, 465
See application file for complete search history.

(56) References Cited

U.S. PATENT DOCUMENTS

| | | | | |
|---|---|---|---|---|
| 5,515,062 A | * | 5/1996 | Maine et al. ............ | 342/457 |
| 5,629,707 A | * | 5/1997 | Heuvel et al. .......... | 342/357.16 |
| 6,018,312 A | | 1/2000 | Haworth | |
| 2002/0034947 A1 | * | 3/2002 | Soliman .................. | 455/436 |
| 2002/0070889 A1 | * | 6/2002 | Griffin et al. ............ | 342/353 |
| 2002/0167444 A1 | * | 11/2002 | Lee ........................ | 342/387 |
| 2003/0085839 A1 | * | 5/2003 | Zhodzishky et al. ... | 342/357.12 |
| 2006/0125695 A1 | * | 6/2006 | Kennedy et al. ........ | 342/451 |
| 2007/0146203 A1 | * | 6/2007 | Chung et al. ........... | 342/451 |

OTHER PUBLICATIONS

R. Ulman et al., Wideband TDOA/FDOA processing using summation of short-time CAF's, IEEE Transactions of Signal Processing, vol. 47(12), p. 3193-3200, Dec. 1999.*
U.S. Appl. No. 11/316,299, filed Dec. 22, 2005, Chung, Hyo et al.

* cited by examiner

*Primary Examiner*—Thomas H. Tarcza
*Assistant Examiner*—Fred H Mull
(74) *Attorney, Agent, or Firm*—Hovey Williams LLP

(57) ABSTRACT

Methods and apparatus operable to estimate the geolocation of a signal emitter. In some embodiments, the methods comprise acquiring collection data from a plurality of collector elements, computing a plurality of candidate geolocations from the acquired collection data, and applying a clustering analysis to the candidate geolocations to estimate the geolocation of the signal emitter.

19 Claims, 3 Drawing Sheets

METHOD AND APPARATUS FOR ESTIMATING GEOLOCATIONS

BACKGROUND

1. Field

Embodiments of the present invention relate to signal tracking. More particularly, various embodiments of the invention provide methods and apparatuses for estimating emitter geolocations utilizing data acquired from a plurality of collector elements.

2. Description of the Related Art

The ability to determine the source geolocation of emitted signals is becoming increasingly important as the use of wireless communications devices becomes commonplace throughout the world. For example, the U.S. Federal Communications Commission Enhanced 911 (E911) rules will eventually require cellular telephone carriers to identify the geolocations, i.e. the physical source locations, of subscribers who place calls to 911 or other emergency services. Additionally, wireless communication device users often desire to acquire accurate geolocations for navigation purposes, such as to generate a route between a current location and a destination. Further, military and law enforcement agencies often desire to locate sources of emitted signals for tracking and targeting purposes.

Methods and devices have been developed that enable signal emitter geolocations to be determined. Some of these methods include utilizing Global Position System (GPS) elements that must be coupled with signal emitters to determine geolocations, thereby increasing system cost and complexity. Other methods include utilizing one or more collector elements, such as antennas, to generate signal measurements and compute geolocations utilizing the generated signal measurements.

Although utilizing signal measurements enables geolocations to be determined without interfering with signal emitters, the algorithms that utilize signal measurements to determine geolocations often produce ambiguous or incorrect results.

SUMMARY

Embodiments of the present invention solve the above-described problems and provide a distinct advance in the art of signal tracking. More particularly, embodiments of the invention provide methods and apparatuses for estimating emitter geolocations utilizing data acquired from a plurality of collector elements.

For example, various embodiments of the present invention provide methods that comprise acquiring collection data from a plurality of collector elements, computing a plurality of candidate geolocations from the acquired collection data, and applying a clustering analysis to the candidate geolocations to estimate the geolocation of a signal emitter. Such methods enable the geolocation of a signal emitter broadcasting on one or more frequencies to be accurately estimated. In some embodiments, the present invention may provide computer programs and computing elements to estimate an emitter geolocation using data acquired from a plurality of collector elements.

Other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein.

Figure 1:
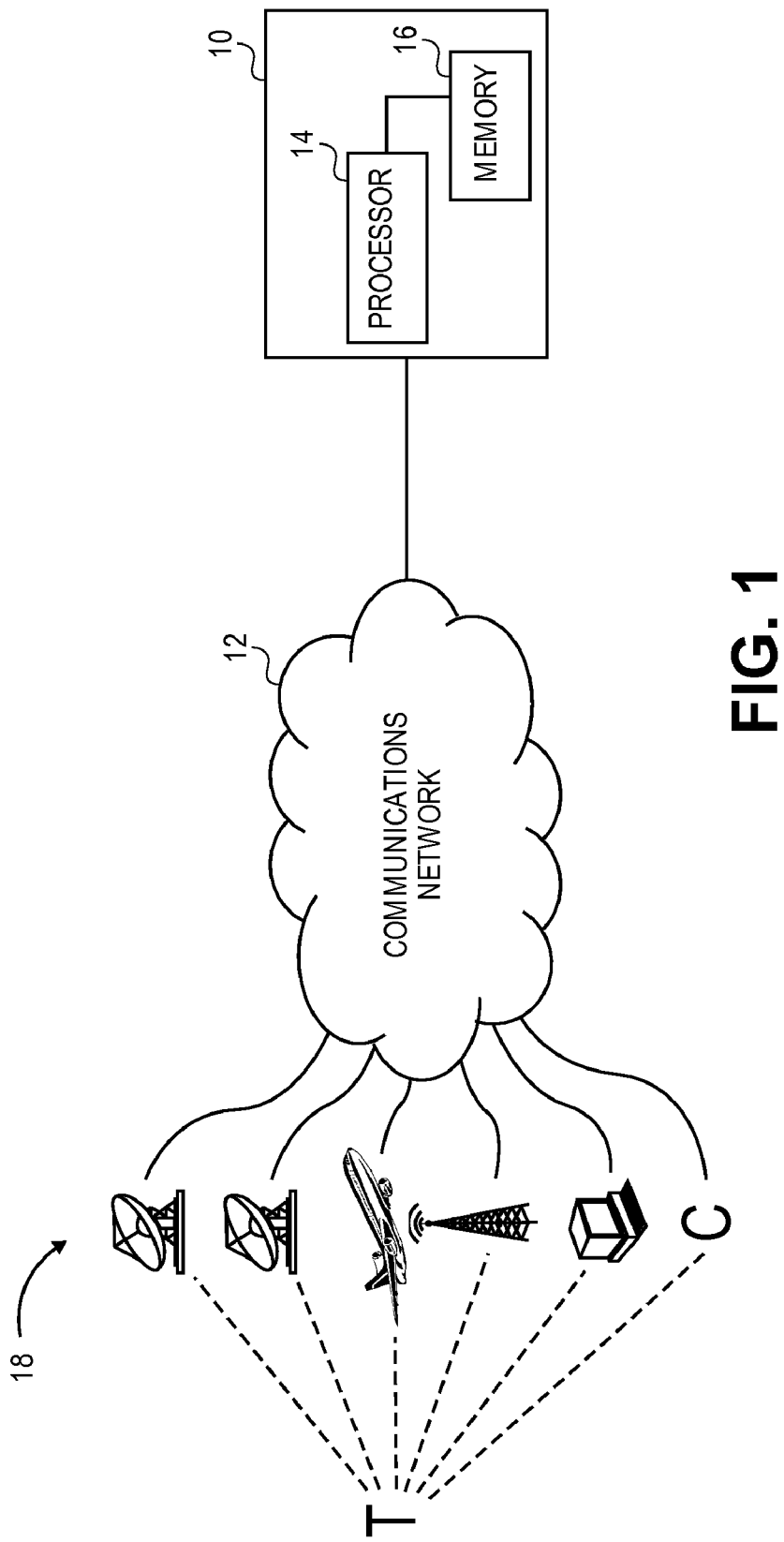
FIG. 1 is a block diagram of some of the elements operable to be utilized by various embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Methods consistent with the present teachings are especially well-suited for implementation by a computing element 10, as illustrated in FIG. 1. The computing element 10 may be coupled with a communications network 12 that enables various devices to exchange information and data. The computing element 10 may include a processor 14 coupled with a memory 16 to perform the various functions described herein. As should be appreciated, the processor 14 and memory 16 may be integral or discrete and comprise various generally conventional devices, such as microcontrollers, microprocessors, programmable logic devices, desktop computers, servers, portable computing devices, etc.

Additionally, the computing element 10 may include additional devices, such as a display for indicating processed information, e.g. an estimated geolocation, or additional processing and memory elements. Further, the computing element 10 may comprise a plurality of computing elements or a network of computing elements such that one or more portions of the invention may be implemented utilizing a first computing element and one or more other portions of the invention may be implemented utilizing a second computing element.

Embodiments of the present invention can be implemented in hardware, software, firmware, or combinations thereof. In some embodiments, the invention may be implemented with a computer program. The computer program and equipment described herein are merely examples of a program and equipment that may be used to implement embodiments of the present invention and may be replaced with other software and computer equipment without departing from the scope of the present teachings. It will also be appreciated that the principles of the present invention are useful independently of a particular implementation, and that one or more of the steps described herein may be implemented without the assistance of the computing element 10.

Computer programs consistent with the present teachings can be stored in or on a computer-readable medium residing on or accessible by the computing element 10, such as the memory 16, for instructing the computing element 10 to implement the method of the present invention as described herein. The computer program may comprise an ordered listing of executable instructions for implementing logical functions in the computing element 10 and other computing devices coupled with the computing element 10. The computer program can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. It will be understood by persons of ordinary skill in the art that the program may comprise a single list of executable instructions or two or more separate lists, and may be stored on a single computer-readable medium or multiple distinct media.

In the context of this application, a "computer-readable medium", including the memory 16, can be any means that can contain, store, communicate, propagate or transport the program for use by or in connection with the instruction execution system, apparatus, or device. The computer-readable medium can be, for example, but not limited to, an electronic, magnetic, optical, electromagnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disc (CD) or a digital video disc (DVD). The computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

As shown in FIG. 1, the computing element 10 is preferably directly or indirectly coupled with one or more collector elements 18 to enable the various functionality described herein. The computing element 10 and the collector elements 18 may be integral such as where one or more of the collector elements 18 are operable to independently perform signal tracking as described herein. Thus, the computing element 10 and collector elements 18 need not necessarily be coupled through the communications network 12 with other devices or collector elements to enable operation of the present invention.

The collector elements 18 may include any devices or elements that are operable to detect and/or otherwise receive an emitted electromagnetic signal from one or more signal emitters. Thus, the collector elements 18 may include stationary and non-stationary antennas, unidirectional and omnidirectional antennas, electrical elements operable to relay a signal, etc. In various embodiments the collector elements 18 may comprise a plurality of communication towers, such as cellular-phone towers, associated via the communications network 12. Thus, the present invention is not limited to the utilization of only one type or configuration of collector element.

Figure 4:
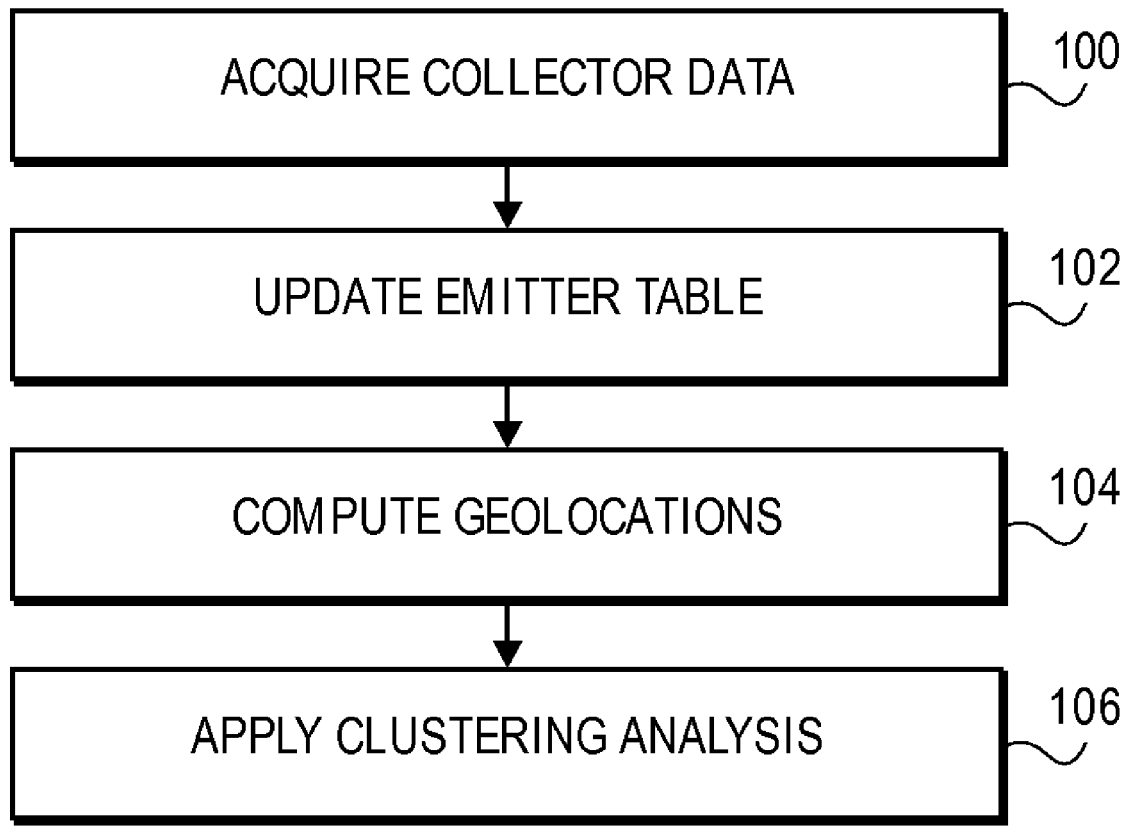
FIG. 4 is a flow chart showing some of the steps operable to be performed by various embodiments of the present invention.

A flowchart of steps that may be utilized by the present invention to determine a geolocation is illustrated in FIG. 4. Some of the blocks of the flow chart may represent a module segment or portion of code of the computer program of embodiments of the present invention which comprises one or more executable instructions for implementing the specified logical function or functions. In some alternative implementations, the functions noted in the various blocks may occur out of the order depicted in FIG. 4. For example, two blocks shown in succession in FIG. 4 may in fact be executed substantially concurrently, or the blocks may sometimes be executed in the reverse order depending upon the functionality involved.

In step 100, collection data is acquired from at least two of the collector elements 18. The collection data may correspond to any information or data corresponding to a target emitter that is obtained by the collector elements 18. Thus, the collection data may include signals broadcast by the target emitter and intercepted by one or more of the collector elements 18. Further, in some embodiments the collection data may include configuration and calibration information corresponding to the collector element 18 from which data is acquired. For example, the collection data may include collection platform navigation information indicating the identity, location, direction, and/or speed of the intercepting collector element 1 8 in addition to the time of the intercept.

The collection data may be acquired by the computing element 10 utilizing the communications network 12 as shown in FIG. 1. The computing element 10 may continuously receive collection data from the collector elements 18, receive collection data at periodic intervals, and/or receive only one batch of collection data. In some embodiments, it may be desirable to repeat step 100 continuously or at periodic intervals to facilitate tracking of moving signal emitters.

In various embodiments, the acquired collection data preferably corresponds to a signal synchronously intercepted by at least two of the collector elements 18. Thus, the acquired collection data may include data provided by a first collector element corresponding to a signal emitted by the target emitter at a first instant and data provided by a second collector element corresponding to the signal emitted by the target emitter at the first instant. Such synchronous acquisition of collection data from at least two of the collector elements 18 facilitates geolocation estimation, as is discussed in more detail below. As should be appreciated, the acquired collection data may include data synchronously collected by any number of collector element and is not limited to the exemplary two collector elements discussed above. For example, it some embodiments it may be desirable to maximize the number of utilized collector elements 18.

In various embodiments, the acquired collection data also preferably includes data acquired by each collector element 18 at a plurality of frequencies. In particular, each collector element 18 is preferably operable to intercept emitted signals at more than one frequency such that the acquired collection data may represent a signal even if the signal is broadcast over varying frequencies. Such a configuration enables the geolocation of the target emitter to be accurately estimated even when the target emitter utilizes more than one frequency for broadcasting as may be encountered if the target emitter employs spread spectrum or frequency hopping techniques.

The collector elements 18 may include integral computing elements such that the various collector elements 18 may communicate through the communications network 12 to exchange or provide collection data. Thus, the computing element 10 is not necessarily discrete from the collector elements 18.

Figures 2, 3:
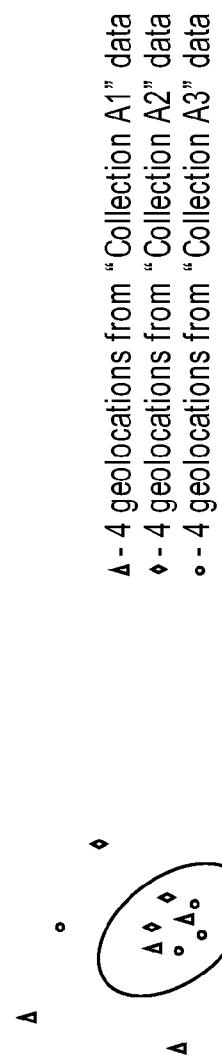
FIG. 2 is a block diagram showing an exemplary emitter table.
FIG. 3 is a chart showing a plot of various candidate geolocations.

In step 102, the collection data acquired in step 100 is utilized to update and/or form an emitter table. The emitter table is a database operable to store and organize the acquired collection data. The emitter table may organize data by the intercepting collector element and the frequency of the intercepted signal. In embodiments where the acquired collection data includes data acquired at different times, the emitter table may organize the data by intercepting collector element, signal frequency, and time. Thus, for example, if two collector elements 18 each obtain data at ten time instants and three frequencies, the emitter table may include three columns with ten data bins for each of the two collector elements 18, as is shown in FIG. 2. Each data bin preferably includes at least four kilobytes of collection data and more preferably includes at least sixteen kilobytes of data to facilitate the generation of the candidate geolocations discussed below. However, the data bins may be configured to store data of any size.

The emitter table is preferably updated each time data is acquired in step 100. In particular, after collection data is acquired in step 100, the computing element 10 preferably checks the emitter table to determine if the collection data corresponds to a previously-identified category. For example, the computing element 10 may determine which collector element 18 acquired the collection data, the time at which the data was collected, and the frequency at which the data was collected. If the acquired data corresponds to previously-acquired data, such as where the emitter table already includes data obtained by a particular collector at a specific time and frequency, the newly acquired data may be appended to the previously-acquired data. If the acquired data does not correspond to previously-acquired data, the computing element 10 may form a new emitter table element, such as a new collector field or a new collection data bin, to represent the new data.

Thus, through repetition of steps 100 and 102, the emitter table may be refreshed and updated to comprehensively represent data acquired by the various collector elements 18. The emitter table may be stored within the memory 16 and/or transmitted through the communications network 12 to enable various devices to utilize the data stored therein.

As should be appreciated, the emitter table does not necessarily present a table format as shown in FIG. 2 as the emitter table may be configured in any other database formats. Further, in some embodiments, step 102 is not necessarily performed as the geolocations determined in step 104 may be acquired without using the emitter table.

In step 104, candidate geolocations are computed utilizing the collection data acquired in step 100. In some embodiments, the candidate geolocations may be computed utilizing the emitter table discussed above in step 102. The candidate geolocations each represent a possible source geolocation for the signal corresponding to the data acquired in step 100. Thus, a particular candidate geolocation may be the actual geolocation of the target emitter, a possible or estimated location of the target emitter, or a geolocation unrelated to the actual geolocation of the target emitter.

The candidate geolocations may be computed utilizing any signal geolocation algorithm that is operable to determine or estimate an emitter geolocation based on the collection data. For example, the first geolocation algorithm may be an algebraic closed-form geolocation algorithm that is operable to provide geolocations utilizing one or more signal measurements and/or collector platform location information. Such algorithms are well known in the art and typically provide an n-order polynomial geolocation solution resulting in a plurality of ambiguous geolocations. For instance, a geolocation algorithm may provide n geolocations, where n is greater than 1, and only one of the n geolocations will represent the actual geolocation of the signal and n-1 of the geolocations will not represent the actual geolocation of the signal. These ambiguous geolocations may be excluded from the candidate geolocations utilizing the various methods disclosed in U.S. patent application Ser. No. 11/316,299, which is incorporated herein by specific reference.

In various embodiments, the computing element 10 employs the Cross Ambiguity Function (CAF) to generate a plurality of time-difference-of-arrival (TDOA)/frequency-difference-of-arrival (FDOA) pairs. The CAF is operable to estimate a received signal's TDOA and FDOA utilizing collection data. An exemplary implementation of the CAF is disclosed in U.S. Pat. No. 6,018,312, which is incorporated herein by specific reference.

For each four kilobytes of collection data, the CAF may be operable to produce a TDOA and FDOA pair. Thus, in embodiments where the emitter table includes a plurality of sixteen kilobyte collection bins, each corresponding to a particular collector element, time, and frequency, the CAF may be operable to produce four TDOA and FDOA pairs per collection bin. However, as should be appreciated, the CAF, or other geolocation algorithms, may be employed to generate any number or combination of signal measurements from data of any size, including measurements such as TDOA/TDOA, direction of arrival (DOA), angle of arrival (AOA), vernier angle, estimated target range, combinations thereof, and the like.

Each TDOA and FDOA pair may be utilized by the computing element 10 to compute one or more candidate geolocations. Algebraic closed-form geolocation algorithms may be utilized to generate two geolocations per TDOA and FDOA pair, with one of the generated geolocations being erroneous or ambiguous. In embodiments of the present invention employing such closed-form geolocation algorithms, the ambiguous geolocations may be excluded from the candidate geolocations utilizing the methods disclosed in U.S. patent application Ser. No. 11/316,299, which is incorporated by reference above. However, in some embodiments the ambiguous geolocations may remain as candidate geolocations due to the clustering analysis discussed below. Further, as discussed above, signal measurements other than TDOA and FDOA may be utilized to generate the candidate geolocations. For example, TDOA/TDOA, FDOA/FDOA, TDOA/DF, or any of the other measurements discussed in the preceding paragraph may be employed.

In some embodiments, the candidate geolocations may be computed by devices other than the computing element 10 and received by the computing element 10 through the communications network 12 and/or by direct user input. Thus, the candidate geolocations are not necessarily directly computed by the computing element 10 in all embodiments of the present invention. For example, in some embodiments the candidate geolocations may be previously acquired by one or more computing devices and stored within the memory 16 or made accessible through the communications network 12 for retrieval by the computing element 10.

Further, the various candidate geolocations may be stored within the memory 16 to facilitate access by the computing element 10. The candidate geolocations may additionally or alternatively be transmitted through the communications network 12 for use by other computing devices.

In step 106, a clustering analysis is applied to the candidate geolocations to accurately estimate and/or ascertain the geolocation of the target emitter. Utilizing the candidate geolocations, the clustering analysis is operable to identify the probable and/or actual geolocation of the target emitter. For example, as shown in FIG. 3, the clustering analysis may be applied to a two-dimensional candidate geolocation plot to identify a cluster area A most likely to include the actual geolocation of the target emitter. Thus, the cluster area A may by itself represent an estimation of the geolocation of the target emitter. However, in some embodiments, the center of the cluster area A may represent the estimated or actual geolocation of the target area. To ascertain the cluster area A, the computing element 10 may identify clusters of candidate geolocations and, based on the cluster including the most candidate geolocations, define the cluster area A.

However, in various embodiments, the clustering analysis preferably includes computing an error variance, computing a standard deviation of the error variance, and removing any geolocation outliers that are outside a particular sigma range. To compute the error variance from N number of candidate geolocations each having a location x, the following equations may be utilized:

$$\sigma^2 = (1/N)\sum_{i=1}^{N}(\mu - x_i)^2$$

where, $$\mu = (1/N)\sum_{i=1}^{N}x_i$$

The standard deviation may then be calculated as follows:

$$\sigma = (\sigma^2)^{1/2}$$

Candidate geolocations that are outside a particular sigma range may then be excluded from the set of candidate geolocations. In various embodiments, the particular sigma range is two sigma. However, any sigma range may be employed to exclude candidate geolocations. In some embodiments, the sigma range may be a user-defined range, a range retrieved from the communications network 12 or memory 16, or a range dynamically computed by the computing element 10 utilizing data stored within the memory 16 such as the collection data acquired in step 100.

After the outlier geolocations are excluded from the set of candidate geolocations, the geolocation of the target emitter may be estimated by averaging the remaining candidate geolocations. Thus, for example, the cluster area A may represent the particular sigma range and the candidate geolocations within the cluster area A may be averaged to estimate the geolocation of the target emitter.

However, the clustering analysis is not limited to the methods discussed above as the clustering analysis may include any statistical techniques operable to identify a probable or actual result from a set of data.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A method of estimating a geolocation of a signal emitter, the method comprising:
   acquiring collection data from a plurality of collector elements, wherein the collection data comprises data corresponding to the signal emitter and configuration and calibration information corresponding to at least one of the collector elements;
   computing a plurality of candidate geolocations from the acquired collection data;
   forming an emitter table to categorize the collection data by frequency and collector element;
   updating the emitter table each time collection data is acquired by either associating the collection data with a collector element listed in the emitter table or forming a new collection data bin to represent the collection data; and
   applying a clustering analysis to the candidate geolocations to estimate the geolocation of the signal emitter.

2. The method of claim 1, wherein the acquired collection data includes data synchronously acquired by each collector element.

3. The method of claim 1, wherein the acquired collection data includes data acquired by each collector element at a plurality of frequencies.

4. The method of claim 1, further including applying a Cross Ambiguity Function (CAF) to the acquired data to generate a plurality of time-difference-of-arrival (TDOA) and frequency-difference-of-arrival (FDOA) pairs.

5. The method of claim 4, wherein the candidate geolocations are computed utilizing the TDOA/FDOA pairs.

6. The method of claim 1, wherein the clustering analysis is applied to the candidate geolocations to determine a cluster area and the geolocation of the signal emitter is estimated by averaging the candidate geolocations within the cluster area.

7. A method of estimating a geolocation of a signal emitter, the method comprising:
   acquiring collection data from a plurality of collector elements, the acquired data including data synchronously acquired by each collector element at a plurality of frequencies, wherein the collection data comprises collection platform navigation information;
   forming an emitter table to categorize the collection data by frequency and collector element;
   generating a plurality of time-difference-of-arrival/frequency-difference-of-arrival (TDOA/FDOA) pairs from the acquired collection data in the emitter table;
   computing a plurality of candidate geolocations utilizing the TDOA/FDOA pairs; and
   applying a clustering analysis to the candidate geolocations to estimate the geolocation of the signal emitter.

8. The method of claim 7, further including repeatedly acquiring collection data from the collector elements and updating the emitter table after each acquisition.

9. The method of claim 7, wherein the clustering analysis is applied to the candidate geolocations to determine a cluster area and the geolocation of the signal emitter is estimated by averaging the candidate geolocations within the cluster area.

10. A computing element operable to estimate a geolocation of a signal emitter, the computing element comprising:
    a memory configured to store collection data acquired from a plurality of collector elements, wherein the collection data comprises the identity, location, direction, and speed of at least one of the collector elements; and a processor coupled with the memory and configured to
sort the collection data by frequency and collector element,
compute a plurality of candidate geolocations from the acquired collection data, and
apply a clustering analysis to the candidate geolocations to estimate the geolocation of the signal emitter.

11. The computing element of claim 10, wherein the processor is further operable to apply a Cross Ambiguity Function (CAF) to the acquired data to generate a plurality of time-difference-of-arrival (TDOA) and frequency-difference-of-arrival (FDOA) pairs.

12. The computing element of claim 11, wherein the processor is operable to compute the candidate geolocations utilizing the TDOA/FDOA pairs.

13. The computing element of claim 10, wherein the processor is operable to apply the clustering analysis to the candidate geolocations to determine a cluster area and estimate the geolocation of the signal emitter by averaging the candidate geolocations within the cluster area.

14. A computer program for estimating a geolocation of a signal emitter, a least a portion of the computer program stored a computer-readable medium for operating a computing element and comprising:
a code segment configured to acquire collection data from a plurality of collector elements, wherein the collection data comprises data corresponding to the signal emitter and configuration and calibration information corresponding to at least one of the collector elements;
a code segment configured to create an emitter table for categorizing the collection data by frequency and collector element;
a code segment operable to compute a plurality of candidate geolocations from the acquired collection data; and
a code segment operable to apply a clustering analysis to the candidate geolocations to estimate the geolocation of the signal emitter.

15. The computer program of claim 14, wherein the acquired collection data includes data synchronously acquired by each collector element.

16. The computer program of claim 14, wherein the acquired collection data includes data acquired by each collector element at a plurality of frequencies.

17. The computer program of claim 14, further including a code segment operable to apply a Cross Ambiguity Function (CAF) to the acquired data to generate a plurality of time-difference-of-arrival (TDOA) and frequency-difference-of-arrival (FDOA) pairs.

18. The computer program of claim 17, wherein the candidate geolocations are computed utilizing the TDOA/FDOA pairs.

19. The computer program of claim 14, wherein the clustering analysis is applied to the candidate geolocations to determine a cluster area and the geolocation of the signal emitter is estimated by averaging the candidate geolocations within the cluster area.

* * * * *